(No Model.)
C. D. COLLEY.
WEIGHING SCOOP.
No. 590,361. Patented Sept. 21, 1897.
Fig. 1.
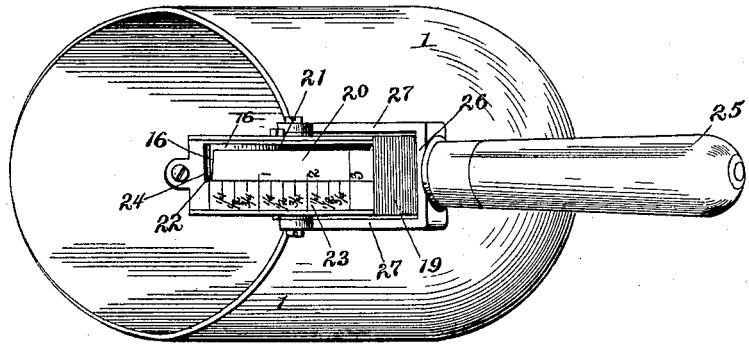
Fig. 2.
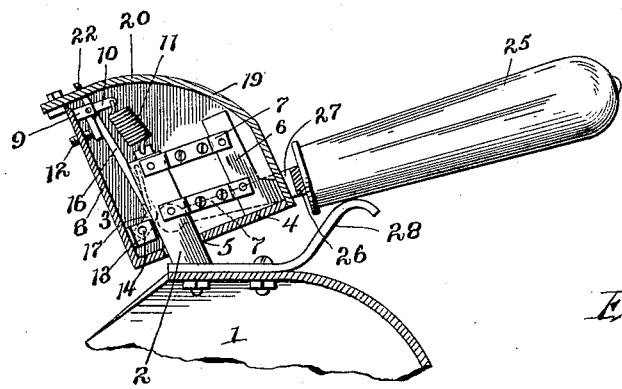
Fig. 5.
Fig. 3.
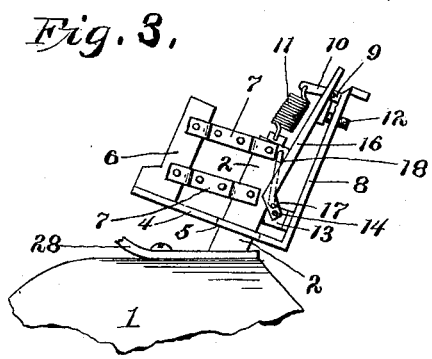
Fig. 4.
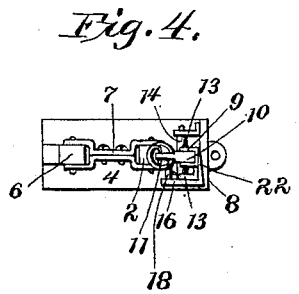
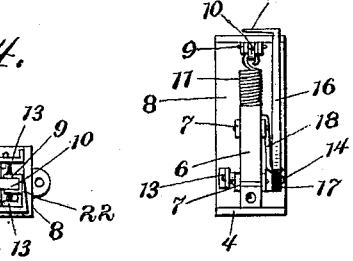
Witnesses
Howard D. Orr.
Edwin Cruse.
Inventor
Clayton D. Colley,
By his Attorneys,
C. A. Snow & Co.
THE NORRIS PETERS CO., PHOTO-LITHO., WASHINGTON, D. C.

UNITED STATES PATENT OFFICE.

CLAYTON D. COLLEY, OF ABINGDON, VIRGINIA.

WEIGHING-SCOOP.

SPECIFICATION forming part of Letters Patent No. 590,361, dated September 21, 1897.

Application filed April 23, 1897. Serial No. 633,454. (No model.)

*To all whom it may concern:*

Be it known that I, CLAYTON D. COLLEY, a citizen of the United States, residing at Abingdon, in the county of Washington and State of Virginia, have invented a new and useful Weighing-Scoop, of which the following is a specification.

This invention relates to weighing-scoops, its object being to improve the construction of devices of this character whereby the scoop will always swing to the proper position to accurately weigh its contents and the weighing mechanism will operate practically without friction, and thereby insure greater accuracy in the weighing.

With these and other objects in view the invention consists in the several details of construction and combination of parts hereinafter fully described, and particularly pointed out in the claims.

In the drawings, Figure 1 is a top plan view of a scoop made in accordance with my invention. Fig. 2 is a vertical longitudinal section, part of the scoop being broken away. Fig. 3 is a side elevation of the weighing mechanism detached. Fig. 4 is a top plan view of the same. Fig. 5 is a rear end view.

Similar reference-numerals indicate similar parts in the several figures.

1 indicates the scoop, from the upper face of which and just in rear of the open front end a standard 2 extends. This standard inclines forwardly at its upper end toward the front end of the scoop and is rigidly connected to the scoop at its lower end in any suitable manner.

3 represents the frame in which the weighing mechanism is supported. This frame consists of a metal bar bent at a right angle about midway of its length, and the horizontal arm 4 of which is provided with an opening 5 to enable it to fit loosely over the standard 2. At the rear end of the horizontal arm 4 a rod 6 extends upwardly at a right angle thereto. 7 indicates a pair of parallel links which are pivoted at one end to the standard 2 and at the other end to the rod 6. In the vertical movement of the frame the standard 2 and rod 6 will always maintain a parallel relation to each other and the horizontal arm of the frame will be kept at a right angle to the standard 2 at all times.

The vertical arm 8 of the frame 3 is provided at its upper end with spaced ears 9, between which an angle-lever 10 is pivoted, the pivotal connection being at the bend of the lever.

11 indicates a coiled spring connected at its upper end to the end of the horizontal arm of the angle-lever 10 and at its lower end to the upper end of the standard 2. A set-screw 12 is fitted in the vertical arm 8 of the frame and is adapted to engage the vertical arm of the angle-lever 10. The object of this screw is to regulate the tension of the spring 11.

At the lower end of the vertical arm 8 of the frame are spaced ears 13, in which the spindle 14 is journaled.

16 indicates the registering-hand, which consists of a metal rod which is bent at an obtuse angle near its lower end to form a short arm 17, the end of which is rigidly connected to one end of the spindle 14. 18 indicates a link which is pivoted at its upper end to the upper portion of the standard 2 and at its lower end to the short arm 17 of the registering-hand at a point between the angle and the spindle 14. By this construction when the frame 3 is moved upwardly the upper end of the registering-hand will be caused to swing in the arc of a circle and the extent of the movement of the upper end of the hand will be regulated by the extent of the movement of the frame.

19 indicates a casing which fits over the weighing mechanism and is detachably secured to the frame 3 in any suitable manner. The upper face 20 of this casing forms the arc of a circle, of which the spindle 14 is the center, and is provided with a slot 21, through which the upper end of the registering-hand 16 projects. The upper end of the registering-hand is bent at a right angle and is pointed, as indicated at 22. A scale 23 is secured or formed on the upper face 20 of the casing, by means of which the weight of the material in the scoop will be ascertained. To facilitate the removal of the casing 19 from the frame 3, the front end of the slot 20 is laterally extended, as indicated at 24, to permit the passage of the bent end 22 of the registering-hand.

25 indicates the handle of the scoop, and this handle is loosely fitted to turn freely on the shank 26. The front end of the shank is bifurcated, and its two arms 27 extend on opposite sides of the casing 19 and are pivoted at their front ends to the casing. By this construction the scoop will be enabled to swing to its center from all directions and its weight will cause the standard 2 to move downwardly relative to the casing 14 and frame 3 at a right angle without causing any friction between the standard 2 and the arm 4 of the frame.

28 indicates a finger-brace which is secured to the top of the scoop and projects to the rear of the casing. The object of this finger-brace is to steady the scoop when it is being used for scooping up any substance. It also serves as a support for the handle 25.

The operation of the device is as follows: The coiled spring 11 will be so adjusted that when the scoop is empty it will cause the pointed end of the registering-hand to be opposite the zero-mark of the scale, but as soon as any weight is added to the scoop it will cause the standard 2 to move downwardly through the opening in the frame and thereby cause the registering-hand to swing on its pivot to indicate on the scale the amount of the additional weight in the scoop, and as soon as the additional weight is removed from the scoop the registering-hand will return to its normal position.

It will be understood that changes in the form, proportion, and minor details of construction may be resorted to without departing from the spirit or sacrificing any of the advantages of this invention.

Having thus described the invention, what I claim is—

1. In a weighing-scoop, the combination with the scoop, of a frame connected to the scoop to have vertical movement relatively thereto, weighing mechanism connected to the frame and scoop, a casing secured to said frame to inclose the weighing mechanism, a shank pivoted to the casing, and a handle fitted on the shank to have rotary movement thereon, substantially as described.

2. In a weighing-scoop, the combination with a scoop having an upwardly-extending standard, a frame fitting loosely over said standard, parallel links pivotally connected to the standard and the frame, a spring connected at one end to the frame and at its other end to the standard, a registering-hand pivoted to said frame, a link pivoted at one end to the said standard and at the other end to the registering-hand, a casing secured to the frame, and a handle pivotally connected to said casing, substantially as described.

3. In a weighing-scoop, the combination with a scoop having an upwardly-extending standard, a frame consisting of a bar bent at a right angle, its horizontal arm having an opening to fit loosely over the standard, a rod extending up from the rear end of said horizontal arm, parallel links pivotally connected at one end to the standard and at the other end to said rod, a spring connected at one end to the frame and at its other end to the standard, a registering-hand pivoted to said frame, a link pivoted at one end to the said standard and at its other end to the registering-hand, a casing secured to the frame, and a handle pivotally connected to said casing, substantially as described.

4. In a weighing-scoop, the combination with a scoop having an upwardly-extending standard, a frame fitting loosely over said standard, parallel links pivotally connected to the standard and the frame, an angle-lever pivoted at its bend to said frame, a coiled spring connected at its upper end to the horizontal arm of said lever and at its lower end to the upper end of the standard, a set-screw working in the casing to engage the vertical arm of the lever, a registering-hand pivoted to said frame, a link pivoted at one end to the said standard and at its other end to the registering-hand, a casing secured to the frame, and a handle pivotally connected to said casing, substantially as described.

5. In a weighing-scoop, the combination with a scoop having an upwardly-extending standard, a frame fitting loosely over said standard, parallel links pivotally connected to the standard and the frame, a spring connected at one end to the frame and at its other end to the standard, a registering-hand pivoted to said frame, a link pivoted at one end to the said standard and at its other end to the registering-hand, a casing secured to the frame, the upper face of said casing forming the arc of a circle with the pivot of the registering-hand for its center, a slot in said upper face through which the registering-hand projects, a scale upon said upper face, and a handle pivotally connected to said casing, substantially as described.

In testimony that I claim the foregoing as my own I have hereto affixed my signature in the presence of two witnesses.

CLAYTON D. COLLEY.

Witnesses:
J. W. BELL,
W. W. WEBB.